(12) United States Patent
Szelagowski et al.

(10) Patent No.: US 10,357,847 B2
(45) Date of Patent: Jul. 23, 2019

(54) INTERCHANGEABLE OPTICS MODULES FOR LASER PROCESSING MACHINES

(71) Applicant: TRUMPF Schweiz AG, Gruesch (CH)

(72) Inventors: Arnd Szelagowski, Kirchheim unter Teck (DE); Thomas Bewer, Richterswil (CH); Adrian Gisler, Baar (CH); Kilian Imhof, Naters (CH)

(73) Assignee: TRUMPF Schweiz AG, Gruesch (CH)

( * ) Notice: Subject to any disclaimer, the term of this patent is extended or adjusted under 35 U.S.C. 154(b) by 171 days.

(21) Appl. No.: 15/156,971

(22) Filed: May 17, 2016

(65) Prior Publication Data

US 2016/0346873 A1 Dec. 1, 2016

(30) Foreign Application Priority Data

May 28, 2015 (EP) .................................... 15169610

(51) Int. Cl.
| | |
|---|---|
| *B23K 26/035* | (2014.01) |
| *B23K 26/064* | (2014.01) |
| *B23K 26/70* | (2014.01) |
| *B23K 37/02* | (2006.01) |
| *B23K 26/00* | (2014.01) |
| *B23K 26/12* | (2014.01) |
| *G02B 7/00* | (2006.01) |

(52) U.S. Cl.
CPC ........ *B23K 26/035* (2015.10); *B23K 26/0093* (2013.01); *B23K 26/064* (2015.10); *B23K 26/128* (2013.01); *B23K 26/702* (2015.10); *B23K 37/0229* (2013.01); *G02B 7/004* (2013.01)

(58) Field of Classification Search
CPC .............. B23K 26/035; B23K 26/0604; B23K 26/0608; B23K 26/067; B23K 26/1476; B23K 26/0093; B23K 26/02; B23K 26/04; B23K 26/042; B23K 26/043; B23K 26/0613; B23K 26/064; B23K 26/073; B23K 26/0823; B23K 26/106; B23K 26/128; B23K 26/14; B23K 26/144; B23K 26/1464; B23K 26/1482; B23K 26/21; B23K 26/24; B23K 26/34; B23K 26/342; B23K 26/38; B23K 26/702; B23K 26/707; B23K 37/0229; B23K 26/08; B23K 26/10
USPC ............ 219/121.63, 121.73, 121.76, 121.67, 219/121.77, 121.84
See application file for complete search history.

(56) References Cited

U.S. PATENT DOCUMENTS

| | | | |
|---|---|---|---|
| 4,899,030 A | 2/1990 | Miyazaki et al. | |
| 6,163,010 A | * 12/2000 | Kobsa .................. | B23K 26/032 219/121.61 |

(Continued)

FOREIGN PATENT DOCUMENTS

| | | |
|---|---|---|
| DE | 3050985 A1 | 7/1985 |
| DE | 4242057 A1 | 6/1994 |
| JP | 61164738 A | 7/1986 |

*Primary Examiner* — Phuong T Nguyen
*Assistant Examiner* — Chris Q Liu
(74) *Attorney, Agent, or Firm* — Fish & Richardson P.C.

(57) ABSTRACT

The invention relates to a interchangeable optics module for a laser processing machine as well as a laser processing machine including the optics module, wherein a beam guide is fixed to a support plate, and the beam guide includes a laser input coupling interface on one end that can be connected to a laser output coupling interface allocated to a laser source, and a processing head on the other end.

15 Claims, 3 Drawing Sheets

(56) References Cited

U.S. PATENT DOCUMENTS

| | | | | |
|---|---|---|---|---|
| 2009/0161238 A1* | 6/2009 | Kosmowski | ......... | B23K 26/046 359/823 |
| 2011/0075274 A1* | 3/2011 | Spoerl | .................... | B23K 26/02 359/814 |
| 2012/0261393 A1* | 10/2012 | Nowotny | ............. | B23K 26/043 219/121.63 |
| 2014/0285900 A1* | 9/2014 | Grapov | ............. | B23K 26/1476 359/641 |

* cited by examiner

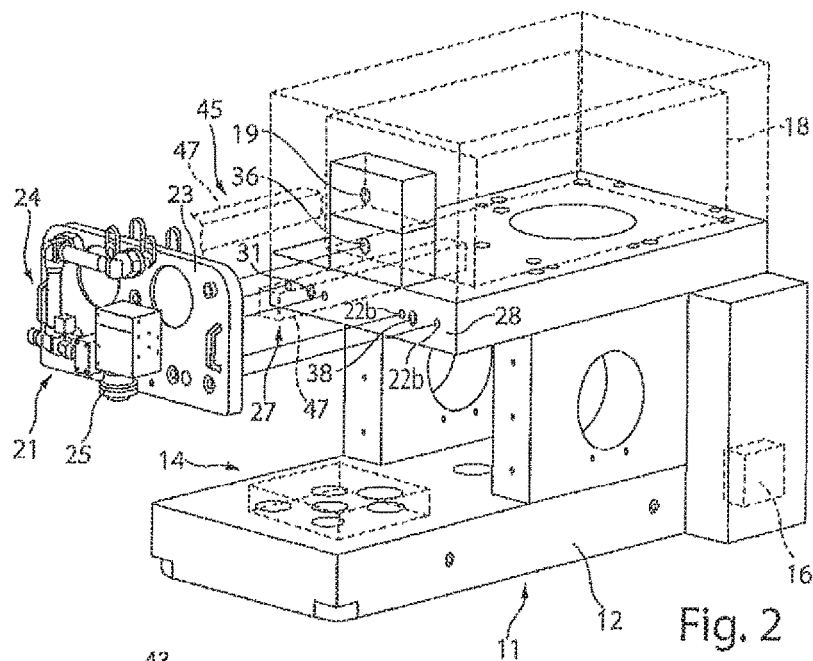
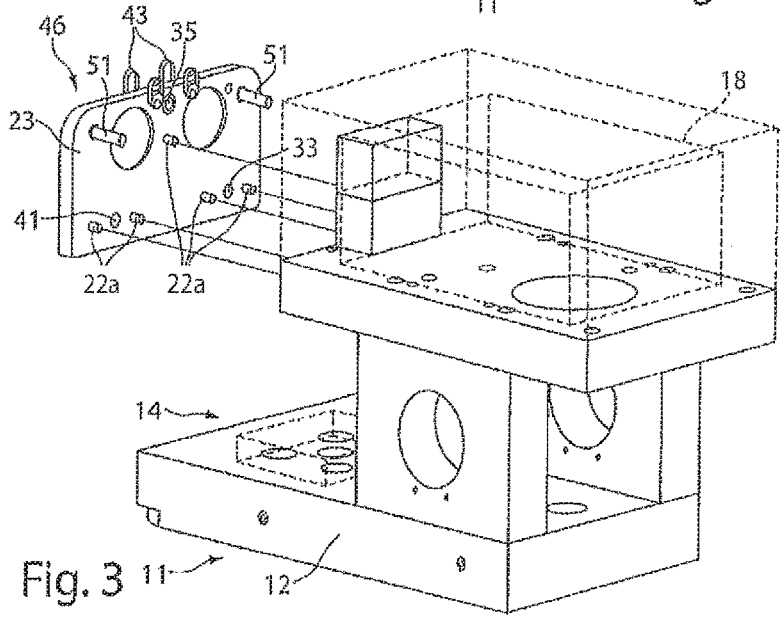

INTERCHANGEABLE OPTICS MODULES FOR LASER PROCESSING MACHINES

CROSS-REFERENCE TO RELATED APPLICATION

This application claims priority under 35 U.S.C. § 119(a) to European Application No. 15 169 610.1, filed on May 28, 2015, the entire contents of which are hereby incorporated by reference.

TECHNICAL FIELD

The invention relates to interchangeable optics modules for laser processing machines.

BACKGROUND

Laser processing machines are known which, for example, are used for micro-processing on workpieces. Such laser processing machines include a machine base body that receives a laser source and a workpiece carrier to receive a workpiece to be processed. A laser beam produced by the laser source is directed via vertical optics, which comprise a beam guide and a processing head, onto the workpiece. The processing head is interchangeable in such laser processing machines. Typical processing heads are scanner heads, which are used for removal, engraving, and fine cutting. Furthermore, fixed optics are used that are mainly used for cutting. Multiple arrangements of the types specified above or also combinations of these can also be useful. Trepanning optics are also used for drilling and cutting with steep wall angles. However, if the processing head is changed, this requires a considerable amount of time, as the beam guide also always needs to be readjusted when the processing head is changed.

SUMMARY

The object of the invention is to enable quick and easy changing of optics, e.g., optical elements, on a laser processing machine.

This object is solved by an interchangeable, e.g., replaceable, optics module that has a rigid support plate, to which a beam guide is fixed. The beam guide has a laser input coupling interface on one end, which can be connected to a laser output coupling interface that is allocated to a laser source, and a processing head on the other end. The laser input and laser output coupling interfaces can be an aperture through which the laser beam passes or an optical element (e.g., a window, mirror, lens, or other optical element). Any optical components influencing the laser beam, such as, for example, lenses, filters, or mirrors, can be positioned between the laser input/output coupling interface and the processing head.

As a result, the beam guide and the processing head on the support plate can be aligned and adjusted separately from the laser processing machine such that the actual exchanging of the optics of such a laser processing machine requires only the release of the previous optics module from the laser processing machine and the subsequent attachment of a new optics module. Due to the arrangement of the beam guide with the processing head on the rigid support plate, an optics module can be exchanged without time-consuming adjustment of the optical elements such that the productivity of the laser processing machine is increased as the non-productive time, which is required, for example, for the alignment and adjustment of the beam guide, is avoided when the processing head is replaced.

It is preferably provided that the beam guide comprises optical components that are firmly arranged and adjusted on the support plate. As a result, constant conditions can be achieved during operation. Time-consuming adjustments or readjustments, which lead to interruptions to the operating time, are no longer necessary.

Furthermore, it is provided that controllable optical components can be arranged in the processing head. For example, these can be so-called scanner heads.

Components of a positioning device can be provided on the support plate, by means of which the support plate is aligned with the machine base frame of the laser processing machine. This positioning device means that it is only necessary to position the support plate on a machine base frame and the support plate is received precisely via the positioning elements once they have been aligned. An exact coupling of the laser beam from a laser source into the beam guide can thereby take place via the laser output/input coupling interfaces of the beam path on the machine base frame and on the support plate.

Furthermore, the positioning device can have at least one centering element and a complementary centering element receiver, e.g., a receiving opening, and at least one alignment element as well as a complementary alignment element receiver. The at least one centering element and/or alignment element or the at least one centering element receiver and/or alignment element receiver are provided on the support plate. Therefore, to replace the optics module, it is only necessary to release and then tighten the releasable connection elements. Thus, alignment and readjustment of the support plate with respect to the machine base frame can be avoided.

The centering element of the positioning device can be formed as a cylindrical dowel pin that can be inserted into the centering element receiver, which can be formed as a fitting sleeve. Therefore, on the one hand, defined receiving of the support plate with respect to the machine base frame and, on the other hand, a pivot with an exactly aligned defined position of the support plate with respect to the machine base frame can be created to align the support plate with the machine base frame using the adjacent alignment element.

The centering element and/or the alignment element and/or the centering element receiver and/or the alignment element receiver furthermore can have an insertion bevel. Mounting can thereby be facilitated because a quick and secure guiding of the centering element into the centering element receiver and the alignment element into the alignment element receiver can occur.

Furthermore, the support plate can have at least two, e.g., at least three, mounting or attachment holes for receiving quickly releasable connection elements. For example, screw elements can be guided through the attachment holes and attached to the machine base body. For example, in one implementation three attachment holes are provided in a preferably isosceles or equilateral triangle on the support plate to achieve a stable and tilt-free arrangement of the support plate on the machine base body.

Furthermore, the support plate can be formed of the same material as the machine base frame. The mounting plate can be formed, for example, of granite. This has the advantage that the same material is used as that used for the machine frame. High precision of the beam guide can also thereby be maintained when temperature fluctuations occur. A further advantage of granite is its high rigidity. If there are low precision requirements, it is also possible to produce the support plate from another material with sufficient rigidity or, for example, also as a sandwich plate having a honeycomb structure.

Furthermore, the support plate can have at least one mounting opening for attaching at least one lifting tool. This enables a quick and secure handling of such an interchangeable optics module, which can be very heavy due to the use of a granite plate as well as the beam guide and processing head installed thereon. Mounting means can therefore be attached thereon in a simple manner.

In another aspect, the disclosure includes a laser processing machine, for which a interchangeable optics module is provided on a machine base body, wherein the interchangeable optics module has a support plate that receives a beam guide that comprises a laser input coupling interface for the laser source on one end and has a processing head on the other end and preferably contains all of the optical elements influencing the laser beam between the laser source and the processing head. By means of such an interchangeable optics module, it is possible to exchange two different optical elements in a quick and easy manner, wherein the optical elements are formed, e.g., as so-called vertical optics. No readjustment is required directly on the laser processing machine. In addition, a person skilled in the art is no longer required to replace or modify the optics.

A further embodiment of the laser processing machine provides that components of the positioning device are arranged on an attachment section on the machine base frame. The components of the positioning device are aligned exactly with laser input/output coupling interfaces for a beam path for guiding the laser beam produced by the laser source.

Furthermore, a laser output coupling interface for the laser source is provided on the attachment section of the machine base frame. An exact coupling of the laser beam into the beam guide arranged on the support plate can thereby take place.

A further embodiment of the laser processing machine provides guides on the machine base frame, by means of which guides the support plate can be moved from an installation position, in which the support plate is attached to the attachment section, into a mounting position, away from the attachment section. A facilitated replacement is thereby enabled in the mounting position, because the interchangeable optics module can be easily removed from a housing of the laser processing machine.

Furthermore, the positioning device can engage with the support plate separately from the guide. The guide preferably engages with an upper end of the support plate such that this is held in a suspended manner. Components of the positioning device are provided on a lower section of the support plate.

The invention, as well as further advantageous embodiments and developments of the invention, are explained in more detail and illustrated below with the aid of the examples depicted in the drawings. The features to be taken from the description and the drawings can be applied individually or together in any combination according to the invention.

DESCRIPTION OF DRAWINGS

FIG. 2 is a perspective view of the laser processing machine according to FIG. 1 having an optics module to be mounted.

FIG. 3 is an alternative view of the arrangement shown in FIG. 2.

DETAILED DESCRIPTION

Figure 1:
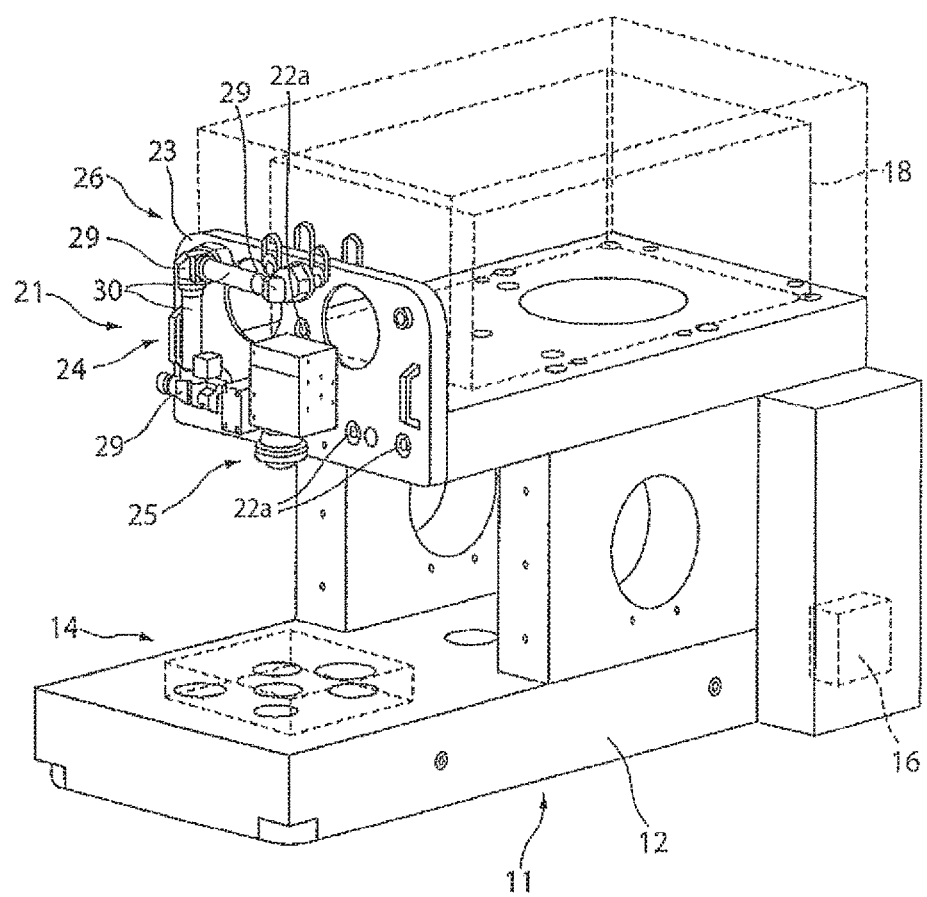
FIG. 1 is a perspective view of a laser processing machine having an interchangeable optics module as described herein.

FIG. 1 is a partial perspective view of a laser processing machine 11 that includes a machine base frame 12 that receives a workpiece carrier 14 in a front region. In this case, this can be a workpiece carrier 14 that firmly clamps the workpiece to be processed and keeps it in a firm position with respect to the machine base frame 12. A workpiece carrier 14 can also be provided that is attached to a linear axes arrangement which is able to be moved at least along a linear axis. Moreover, a workpiece carrier 14 can be provided that also has at least one axis of rotation, alone or in addition to the at least one linear axis. A controller 16 is provided, for example, at the side of the machine base frame 12, by means of which the laser processing machine 11 can be programmed and controlled. Further components required to operate the laser processing machine 11, such as, for example, a display, a keypad, data processing devices or similar, are not depicted in more detail.

A laser source 18 is provided on the machine base frame 12, which is coupled to an interchangeable optics module 21. This interchangeable optics module 21 is attached to the machine base frame 12 in an installation position 26. This optics module 21 carries a beam guide 24 as well as a processing head 25 on a rigid support plate 23 to direct a laser beam produced by a laser source 18 onto the workpiece carrier 14 on which the workpiece is arranged for processing. The beam guide 24 comprises deflection mirrors 29, for example, and beam guide tubes 30 arranged therebetween. Furthermore, the beam guide 24 can comprise elements such as, for example, beam splitters, filters, wave-plates, adapters for camera systems, sensors and similar. Preferably, the beam guide does not contain optical components that are able to be controlled during processing such as, for example, lenses, filters or mirrors. The processing head 25 can, for example, be formed as a scanner head or with fixed optics or trepanning optics. The processing head 25 can in some embodiments contain at least one optical element focusing the laser beam.

The machine base frame 12 can be formed, for example, of granite. The support plate 23 can also be formed of granite.

The optics module 21 is interchangeably attached to the machine base frame 12 by means of releasable connection elements 22a such as, for example, screws or bolts and screw or bolt holes 22b.

Figure 4:
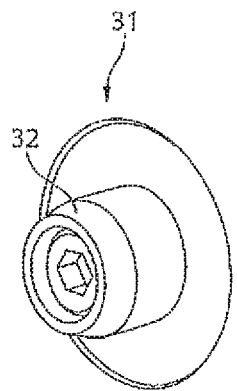
FIG. 4 is a perspective view of a centering element of a positioning device.

In FIGS. 2 and 3, two different perspective views of the machine base frame 12 are depicted with an optics module 21 to be mounted. Components of a positioning device 27 are provided on the side of the support plate 23 that faces the machine base frame 12. The complementary components of the positioning device 27 are likewise provided on an attachment section 28 of the machine base frame 12. The positioning device 27 comprises a centering element 31, which is depicted in more detail in FIG. 4. For example, the centering element 31 can be a cylindrical dowel pin that has an insertion bevel 32 on its front free end. The centering element 31 can be attached to the attachment section 28 of the machine base frame 12. In the support plate 23, a centering element receiver 33 is provided opposite the centering element 31, wherein the centering element receiver 33 can be formed as a fitting sleeve such that a highly precise positioning of the centering element 31 in the centering element receiver 33 takes place. At the same time, a pivot for the support plate 23 is created by the arrangement of the centering element 31, e.g., a dowel pin, in the centering element receiver 33, e.g., in the form of a fitting sleeve, to balance the support plate 23 with respect to an angularity with the machine base frame 12 such that a laser input coupling interface 35 of the beam guide 24 on the interchangeable optics module 21 can be aligned exactly with the laser output coupling interface 36 on the machine base frame 12 with respect to the laser source 18.

Figure 5:
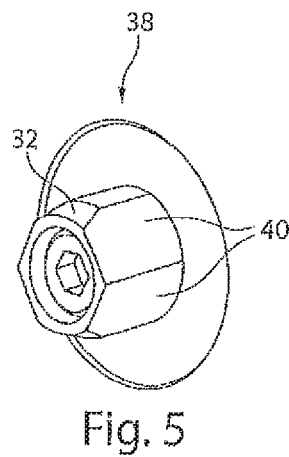
FIG. 5 is a perspective view of an alignment element of the positioning device.

Furthermore, the positioning device 27 comprises an alignment element 38, which is depicted in more detail in FIG. 5. This alignment element 38 can be, for example, formed as a bevel pin and comprises bevels 40 which, for example, lie opposite each other at 180°. The beveling serves to prevent an overdetermined bearing. The alignment element 38 thus serves only for the adjustment of the angularity of the optics module 21 with respect to the machine base frame 12, i.e., the horizontal alignment of the optics module 21. An alignment element receiver 41, e.g., in the form of a fitting sleeve, is incorporated in the support plate 23. The alignment element receiver 41 thus can be placed on the alignment element 38. The alignment element 38 can also have an insertion bevel 32. The fitting sleeves in the support plate 23 can likewise advantageously have insertion bevels.

The described arrangement of the positioning elements 27 can also be provided in an interchanged manner.

At least one optical component 19 is provided between the laser source 18 and the laser output coupling interface 36 for beam guidance and beam formation of the laser beam, in particular for adjusting the alignment of the laser beam, which is only depicted symbolically. For example, adjustable mirrors can be provided. These can be adjusted and aligned once to adjust the laser beam to be decoupled from the laser output coupling interface 36. Alternatively, it can be provided that the optical components 19 are controlled by a sensor/actuator system such that an active adjustment and alignment of the laser beam is also possible during operation of the laser processing machine 11 by the controller 16.

The releasable connection elements 22a are provided adjacent to the centering element 31 and the alignment element 38. A further releasable connection element is arranged adjacent to the laser input coupling interface 35 of the beam guide 24. It can therefore be ensured that the support plate 23 is attached exactly aligned to the attachment section 28 and how laser input/output coupling interfaces 35, 36 are aligned with one another.

For simple replacement or exchange of the interchangeable optics module 21, lifting tools 43, for example, holding eyelets or similar, can be inserted into mounting openings in the support plate 23 to secure and mount the interchangeable optics module 21 on a lifting device, e.g., by means of ropes or cables. The releasable connection elements 22a are then released and the optics module 21 is lifted off the machine base frame 12. The new optics module 21 is then aligned with the machine base frame 12 and positioned in the correct position with respect to the machine base frame 12 by means of the positioning device 27 and is then fixed, in turn, by fastening the releasable connection elements 22a into their respective threaded holes or sockets 22b. Subsequently, the laser processing machine 11 is ready to be used for further workpiece processing.

Furthermore, for simple replacement or exchange of the interchangeable optics module 21, a guide 45 can be provided on the machine base frame 12 to engage with the support plate 23. This guide 45 can be formed as a linear guide, whereby the interchangeable optics module 21 is able to be transferred into a mounting position 46 away from the attachment section 28 on the machine base frame 12 after the release of the releasable connection elements 22a. The interchangeable optics module 21 can thereby be moved out from a housing of the laser processing machine 11, which is not depicted in more detail, to provide good accessibility and simple handling for the subsequent exchanging of the optics module 21.

Figure 6:
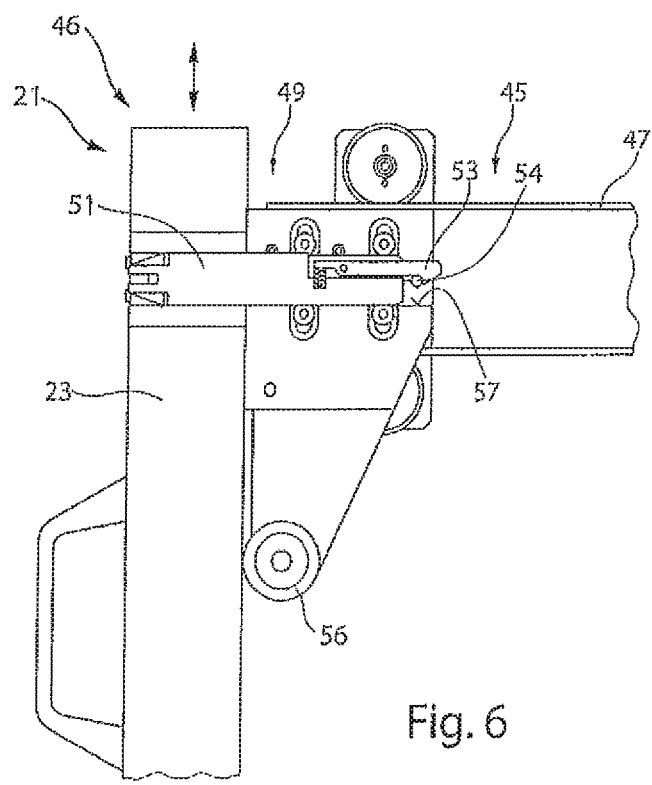
FIG. 6 is a schematic detailed view of mounting the optics module on an extendible guide of a laser processing machine.

In FIG. 6, a schematic detailed view is depicted of mounting the optics module 21 on an extendible guide 45 on the machine base frame 12 of the laser processing machine 11. This arrangement, depicted in FIG. 6, shows the mounting position 46 of the support plate 23.

The guide 45 comprises a guide rail 47, which is retractable and extendible with respect to the machine base frame 12. A mounting device 49 is provided on the front end of the guide rail 47, wherein the mounting device 49 serves to pre-mount the optics module 21. For quick and easy exchanging of the optics module 21, it is provided that the mounting device 49 is U-shaped such that simple mounting from above into the mounting device 49 and lifting upwards to remove the optics module 21 from the mounting device 49 is enabled. For this purpose, attachment elements 51, for example, mounting bolts, are provided on the support plate 23, which can be inserted from the front, in particular from above, into the mounting device 49. A spring-loaded latching element 53 is provided on the front end of the mounting bolt 51, said latching element 53 engaging with a transverse bolt 54, which extends transversely with respect to the U-shaped mounting device 49, and secures the position of the support plate 23 with respect to the mounting device 49. The mounting device 49 furthermore has a support roller 56 that abuts on a rear side of the support plate 23 in the mounting position. This support roller 56 forms a support point away from the attachment element 51. At the same time, the support plate 23 having the mounting bolt 51 abuts on a support surface 57 of the U-shaped mounting device 49. In addition, the latching element 53 engages behind the transverse bolt 54 to prevent the release of the mounting bolt 51 from the mounting device 49.

The spring-loaded arrangement of the latching element 53 is formed in such a way that the support plate 23 is kept secured in a mounting position 46, however, independently releases itself when the support plate 23 is lifted upwards in the arrow direction depicted in FIG. 6. By means of the support roller 56, the support plate 23 can be guided thereon during lifting upwards.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. An interchangeable optics module for a laser processing machine having a machine base frame and a laser source, the optics module comprising
   a beam guide having first and second ends, wherein the beam guide comprises a laser input coupling interface on the first end and a processing head on the second end; and
   a support plate on which the beam guide is mounted, wherein the support plate comprises mounting openings,
   wherein the laser input coupling interface on the first end of the beam guide is configured and arranged to be aligned with a laser output coupling interface of the laser source when the interchangeable optics module is mounted on the laser processing machine,
   wherein the support plate comprises one or more releasable connection elements and one or more attachment elements configured to attach the support plate to the machine base frame,
   wherein the support plate further comprises a positioning device that precisely aligns the support plate with the machine base frame of the laser processing machine,
      wherein the positioning device comprises at least one centering element and a complementary centering element receiver, and at least one alignment element and a complementary alignment element receiver,
         wherein the at least one centering element or the at least one centering element receiver is provided on the support plate and the at least one complementary centering element receiver or the at least one complementary centering element is provided on the machine base frame, and
         wherein the at least one alignment element or the at least one alignment element receiver is provided on the support plate and the at least one complementary alignment element receiver or the at least one complementary alignment element receiver is provided on the machine base frame,
         wherein the centering element comprises a cylindrical dowel pin and the alignment element comprises a bevel pin, which are configured to be inserted into the centering element receiver and the alignment element receiver, respectively, and
         wherein the centering element receiver and the alignment element receiver both comprise fitting sleeves to provide highly precise positioning of the centering element in the centering element receiver and of the alignment element into the alignment element receiver.

2. The interchangeable optics module of claim 1, wherein the beam guide further comprises optical components that are firmly arranged and adjusted on the support plate.

3. The interchangeable optics module of claim 1, wherein the processing head comprises a scanner head.

4. The interchangeable optics module of claim 1, wherein the support plate comprises at least two mounting holes for the releasable connection elements, by means of which the support plate is configured to be attached to the machine base frame.

5. The interchangeable optics module of claim 1, wherein the support plate is formed of granite.

6. The interchangeable optics module of claim 1, wherein the one or more attachment elements are configured to be inserted into a mounting device on a guide arranged on the machine base frame, wherein the guide comprises a guide rail that is retractable and extendable with respect to the machine base frame.

7. The interchangeable optics module of claim 1, wherein the mounting openings are configured for the attachment of at least one lifting tool.

8. The interchangeable optics module of claim 1, wherein the alignment element comprising a bevel pin comprises beveling to prevent an overdetermined bearing.

9. A laser processing machine comprising
   a machine base frame;
   a workpiece carrier arranged on the machine base frame for receiving a workpiece to be processed;
   a laser source arranged on the machine base frame; and
   an interchangeable optics module mountable on the machine base frame and comprising
      a beam guide having first and second ends, wherein the beam guide comprises a laser input coupling interface on the first end and a processing head on the second end; and
      a support plate on which the beam guide is mounted, wherein the support plate comprises mounting openings,
   wherein the laser input coupling interface on the first end of the beam guide is configured and arranged to be aligned with a laser output coupling interface of the laser source when the interchangeable optics module is mounted on the laser processing machine,
   wherein the beam guide directs a laser beam from the laser source to the workpiece,
   wherein the support plate comprises one or more releasable connection elements and one or more attachment elements configured to attach the support plate to the machine base frame,
   wherein the support plate further comprises a positioning device that precisely aligns the support plate with the machine base frame of the laser processing machine,
      wherein the positioning device comprises at least one centering element and a complementary centering element receiver, and at least one alignment element and a complementary alignment element receiver,
         wherein the at least one centering element or the at least one centering element receiver is provided on the support plate and the at least one complementary centering element receiver or the at least one complementary centering element is provided on the machine base frame, and
         wherein the at least one alignment element or the at least one alignment element receiver is provided on the support plate and the at least one complementary alignment element receiver or the at least one complementary alignment element receiver is provided on the machine base frame,
         wherein the centering element comprises a cylindrical dowel pin and the alignment element comprises a bevel pin that are configured to be inserted into the centering element receiver and the alignment element receiver, respectively, and
         wherein the centering element receiver and the alignment element receiver both comprise fitting sleeves to provide highly precise positioning of the centering element in the centering element receiver and of the alignment element into the alignment element receiver.

10. The laser processing machine of claim 9, further comprising an attachment section for receiving the interchangeable optics module arranged on the machine base frame, wherein components of a positioning device are provided on the attachment section.

11. The laser processing machine of claim 10, wherein the laser output coupling interface of the laser source is arranged on the attachment section of the machine base frame.

12. The laser processing machine of claim 10, further comprising at least one adjustable optical component arranged on the machine base frame between the laser source and the laser output coupling interface for adjusting alignment of the laser beam.

13. The laser processing machine of claim 10, further comprising guides arranged on the machine base frame, by means of which the support plate is configured to be moved from an installation position, in which the support plate is attached to the attachment section, into a mounting position, away from the attachment section.

14. The laser processing machine of claim 13, wherein the guides engage with the support plate separately from the positioning device.

15. The laser processing machine of claim 13, wherein the guides comprise guide rails that are retractable and extendable with respect to the machine base frame.

* * * * *